(12) United States Patent
Hong et al.

(10) Patent No.: US 10,189,022 B2
(45) Date of Patent: Jan. 29, 2019

(54) MICROFLUIDIC DEVICE

(71) Applicant: National Tsing Hua University, Hsinchu (TW)

(72) Inventors: Chien-Chong Hong, Hsinchu County (TW); Chia-Hung Lee, Taoyuan (TW)

(73) Assignee: National Tsing Hua University, Hsinchu (TW)

( * ) Notice: Subject to any disclaimer, the term of this patent is extended or adjusted under 35 U.S.C. 154(b) by 228 days.

(21) Appl. No.: 15/069,153

(22) Filed: Mar. 14, 2016

(65) Prior Publication Data

US 2017/0165663 A1    Jun. 15, 2017

(30) Foreign Application Priority Data

Dec. 15, 2015  (TW) .............................. 104142028 A

(51) Int. Cl.
*B01L 3/00* (2006.01)
*B01J 13/00* (2006.01)
(Continued)

(52) U.S. Cl.
CPC ...... *B01L 3/502715* (2013.01); *B01F 3/0807* (2013.01); *B01F 5/0647* (2013.01); *B01F 5/0655* (2013.01); *B01F 13/0059* (2013.01); *B01F 15/0258* (2013.01); *B01J 13/00* (2013.01); *B01L 3/0241* (2013.01); *B01L 3/50273* (2013.01); *B01L 3/502784* (2013.01); *B01L 2300/0838* (2013.01); *B01L 2300/0867* (2013.01); *B01L 2300/0883* (2013.01); *B01L 2300/0887* (2013.01); *B01L 2300/12* (2013.01);
(Continued)

(58) Field of Classification Search
CPC .............. B01J 13/00; B01L 2300/0838; B01L 2300/0867; B01L 2300/0883; B01L 2300/0887; B01L 2300/12; B01L 2300/161; B01L 2400/0406; B01L 2400/049; B01L 3/502715; B01L 3/50273
See application file for complete search history.

(56) References Cited

U.S. PATENT DOCUMENTS

| 4,599,082 A * | 7/1986 | Grimard ............... A61M 5/284 215/355 |
| 2010/0233026 A1* | 9/2010 | Ismagliov ............ B01F 5/0646 422/68.1 |
| 2011/0081275 A1* | 4/2011 | Claussen ............... B01F 5/0471 422/68.1 |

FOREIGN PATENT DOCUMENTS

| GB | 2097692 A * | 11/1982 | ............... B01F 3/08 |
| TW | 2009/09180 A | 3/2009 | |

(Continued)

*Primary Examiner* — Dennis White
*Assistant Examiner* — Bryan Kilpatrick
(74) *Attorney, Agent, or Firm* — Cesari and McKenna, LLP

(57) ABSTRACT

A microfluidic device includes a substrate, first and second capillary inlets, a microfluidic channel unit, an outlet disposed downstream of the microfluidic channel unit, and a suction member disposed downstream of the outlet. A first liquid is drawn into a first sub-channel and a main channel of the microfluidic channel unit through the first capillary inlet. A second liquid is drawn into a second sub-channel of the microfluidic channel unit through the second capillary inlet. The suction member provides a predetermined suction force to permit the second liquid to penetrate into the first liquid and to break up into droplets in the first liquid, thereby generating monodisperse emulsions.

7 Claims, 7 Drawing Sheets

(51) Int. Cl.
*B01F 5/06* (2006.01)
*B01F 13/00* (2006.01)
*B01F 15/02* (2006.01)
*B01F 3/08* (2006.01)
*B01L 3/02* (2006.01)

(52) U.S. Cl.
CPC . *B01L 2300/161* (2013.01); *B01L 2400/0406* (2013.01); *B01L 2400/049* (2013.01)

(56) References Cited

FOREIGN PATENT DOCUMENTS

| | | |
|---|---|---|
| TW | 201134861 A1 | 10/2011 |
| TW | 201236750 A1 | 9/2012 |
| TW | 201240073 A1 | 10/2012 |

\* cited by examiner

MICROFLUIDIC DEVICE

CROSS-REFERENCE TO RELATED APPLICATIONS

This application claims priority from Taiwanese application no. 104142028, filed on Dec. 15, 2015.

BACKGROUND

Technical Field

The disclosure relates to a microfluidic device, more particularly to a microfluidic device for generating monodisperse emulsions.

Background Information

Conventionally, for generating monodisperse emulsions, a microfluidic device as shown in FIG. 1 may be used. The microfluidic device includes a main channel 90 and two sub-channels 91, 92. An aqueous liquid 901 is delivered to the main channel 90, and an oily liquid 902 is delivered to the two sub-channels 91, 92. Both the aqueous liquid 901 and the oily liquid 902 are driven by a positive pressure supplied by syringe pumps (not shown). Droplets 903 are formed at a place where the aqueous liquid 901 and the oily liquid 902 meet, and are driven by the syringe pumps to an observation zone (not shown) of the microfluidic device for observation. For driving the aqueous liquid 901 and the oily liquid 902, the main channel 90 and the sub-channels 91, 92 are respectively connected to the syringe pumps by three narrow tubes (not shown). Therefore, it is relatively complicated to connect the microfluidic device with the syringe pumps.

In addition, if the aqueous liquid 901 and the oily liquid 902 are driven by a negative pressure applied at a location downstream of the main channel 90 and the sub-channels 91, 92, it is necessary to supply the amount of pressure needed to drive 901 and 902 simultaneously to thereby generate monodisperse emulsions. Besides, the microfluidic device using a negative pressure still needs to be connected to a syringe pump (not shown). Therefore, most researchers would prefer not to use a negative pressure to generate monodisperse emulsions.

One of the inventors of this application has proposed, in US patent application publication no. 2011/0247707 A1, a microfluidic chip device in which a fluid is driven by a negative pressure. However, the microfluidic chip device is not intended to generate monodisperse emulsions.

SUMMARY

Therefore, an object of the disclosure is to provide a microfluidic device with a suction member. With the provision of the suction member, a predetermined suction force (i.e., a negative pressure) is produced to drive movements of first and second liquids to thereby generate monodisperse emulsions. In addition, the microfluidic device and the suction member are portable and can be easily assembled.

According to the disclosure, a microfluidic device includes a substrate, a first capillary inlet, a second capillary inlet, a microfluidic channel unit, an outlet, and a suction member. The substrate has upper and lower surfaces, and defines an emulsion forming zone. The first capillary inlet is formed in the upper surface of the substrate for passage of a first liquid therethrough. The second capillary inlet is formed in the upper surface of the substrate for passage of a second liquid therethrough. The second liquid is immiscible with the first liquid. The microfluidic channel unit is formed in the substrate and has a high affinity for the first liquid. The microfluidic channel unit includes a main channel, a first sub-channel, and a second sub-channel. The main channel extends through the emulsion forming zone to terminate at a proximal end and a distal end disposed downstream of the proximal end. The first sub-channel is disposed downstream of the first capillary inlet and upstream of the proximal end of the main channel such that the first liquid is drawn into the first sub-channel through the first capillary inlet by virtue of capillary action of the first liquid, and is further drawn into the main channel by the affinity between the first liquid and the microfluidic channel unit. The second sub-channel is disposed downstream of the second capillary inlet and upstream of the proximal end of the main channel so as to permit the second liquid to be drawn into the second sub-channel through the second capillary inlet by virtue of a capillary action of the second liquid. The outlet is formed in the lower surface of the substrate and is disposed downstream of the distal end of the main channel. The suction member is made from a shape memory polymer, and is disposed downstream of the outlet. The suction member is configured to provide a predetermined suction force such that the second liquid in the second sub-channel is permitted to penetrate into the first liquid in the main channel so as to break up into droplets in the first liquid, thereby generating monodisperse emulsions in the emulsion forming zone.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
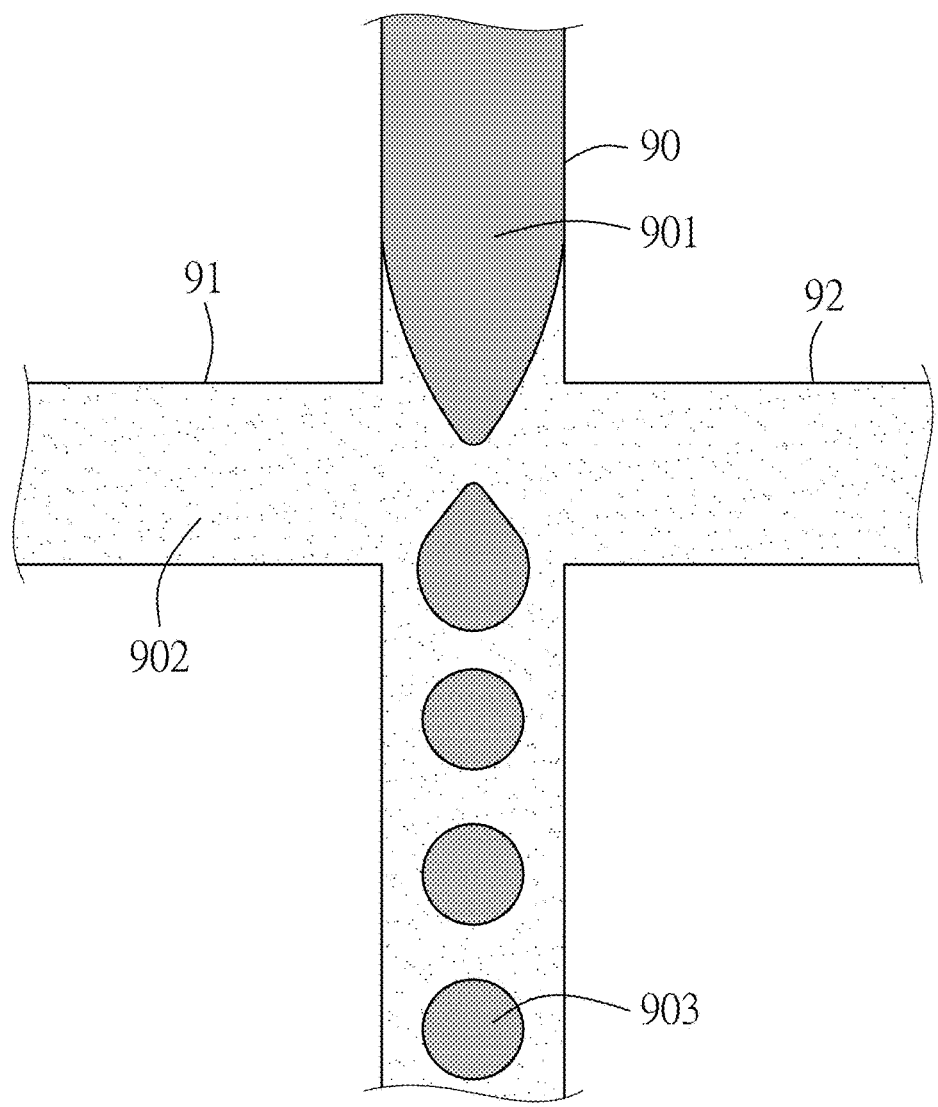
FIG. 1 is a schematic view illustrating a conventional microfluidic device.
Figure 2:
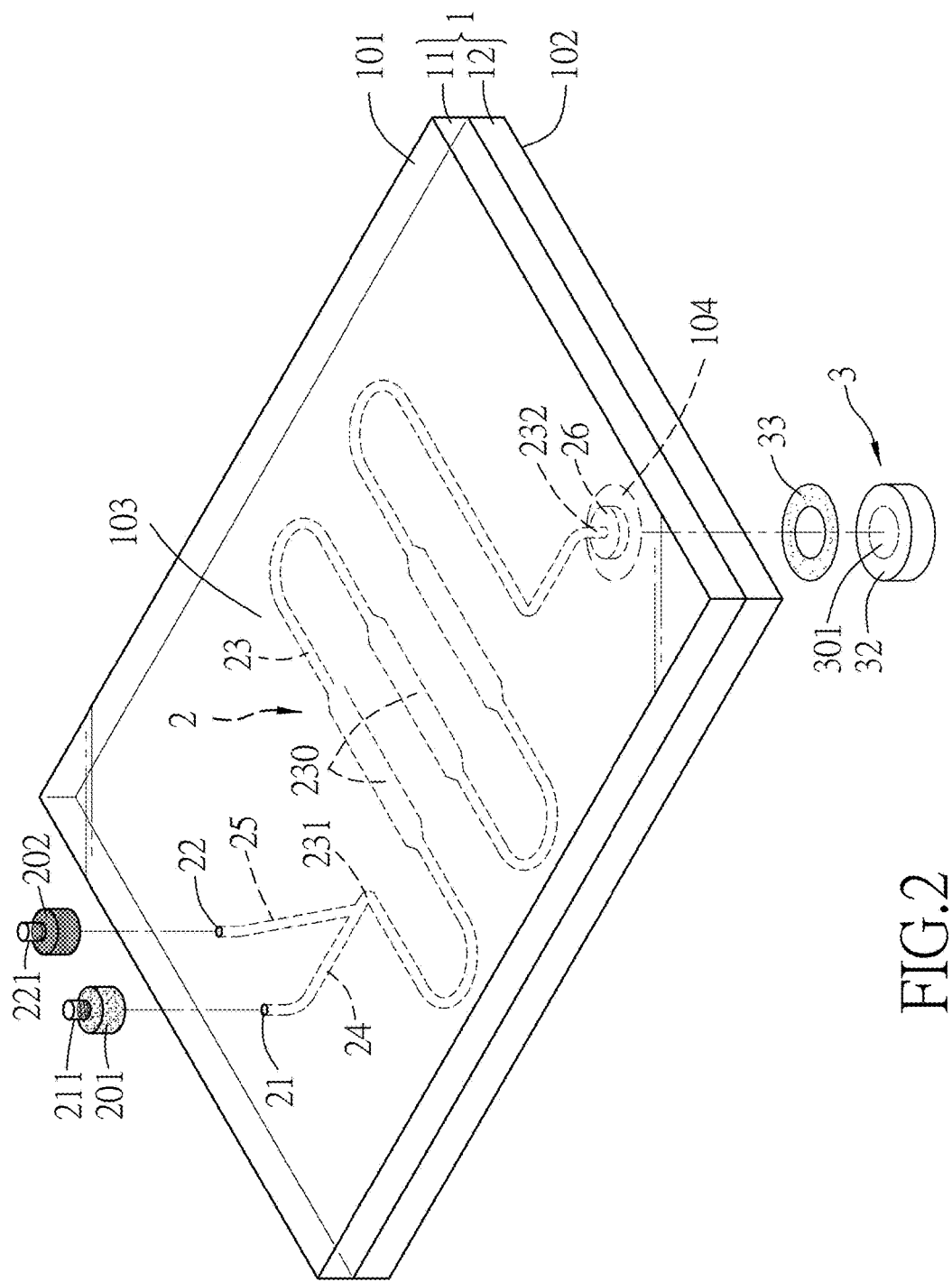
FIG. 2 is a schematic view illustrating a microfluidic device according to the disclosure.

With reference to FIGS. 2 and 3, a microfluidic device for generating monodisperse emulsions includes a substrate 1, a first capillary inlet 21, a second capillary inlet 22, a microfluidic channel unit 2, an outlet 26, and a suction member 3.

The substrate 1 has upper and lower surfaces 101, 102, and defines an emulsion forming zone 103 for observation purposes.

The first capillary inlet 21 is formed in the upper surface 101 of the substrate 1 for passage of a first liquid 201 therethrough.

The second capillary inlet 22 is formed in the upper surface 101 of the substrate 1 for passage of a second liquid 202 therethrough. The second liquid 202 is immiscible with the first liquid 201.

The microfluidic channel unit 2 is formed in the substrate 1 and has a high affinity to the first liquid 201. The microfluidic channel unit 2 includes a main channel 23, a first sub-channel 24, and a second sub-channel 25.

The main channel 23 extends through the emulsion forming zone 103 to terminate at a proximal end 231 and a distal end 232 disposed downstream of the proximal end 231. In this embodiment, the main channel 23 is meander-shaped and includes a plurality of enlarged regions 230 which are parallel to each other.

Figure 3A:
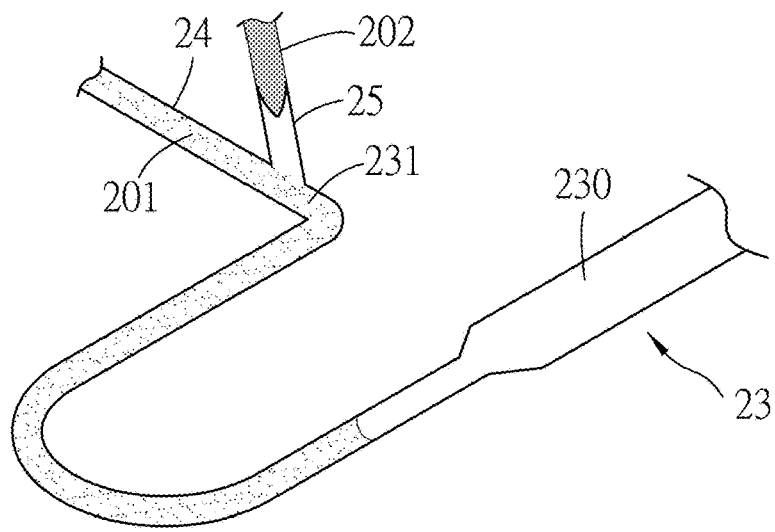
FIGS. 3(a) and 3(b) are schematic views illustrating first and second liquids before and after a predetermined suction force is generated by a suction member of the microfluidic device, respectively.
Figure 3B:
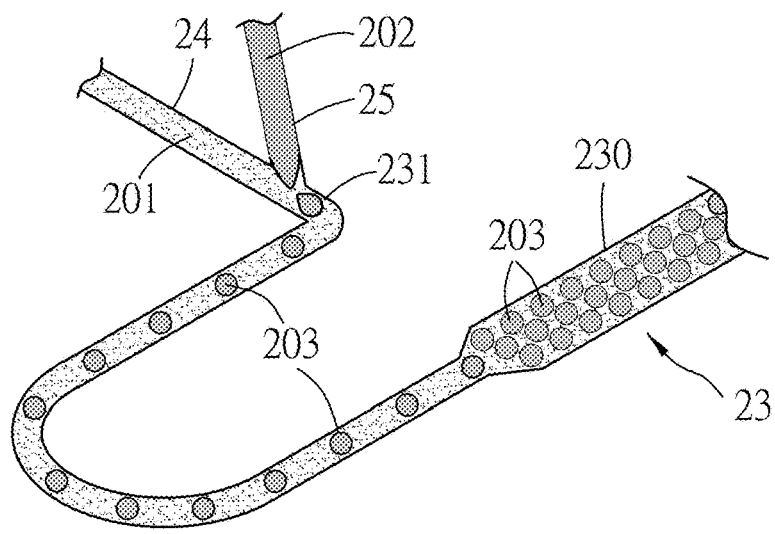

The first sub-channel 24 is disposed downstream of the first capillary inlet 21 and upstream of the proximal end 231 of the main channel 23 such that the first liquid 201 is first drawn into the first sub-channel 24 through the first capillary inlet 21 by virtue of capillary action of the first liquid 201, and is further drawn into the main channel 23 by the affinity of the first liquid 201 with the microfluidic channel unit 2 (see FIG. 3(a)).

The second sub-channel 25 is disposed downstream of the second capillary inlet 22 and upstream of the proximal end 231 of the main channel 23 so as to permit the second liquid 202 to be drawn into the second sub-channel 25 through the second capillary inlet 22 by virtue of a capillary action of the second liquid 202 (see FIG. 3(a)).

In this embodiment, as shown in FIG. 2, the first and second liquids 201, 202 are respectively stored in first and second reservoirs 211, 221. Once inner spaces of the first and second reservoirs 211, 221 are respectively in fluid communication with the first and second capillary inlets 21, 22, the first and second liquids 201, 202 stored in the first and second reservoirs 211, 221 are respectively drawn into the first sub-channel 24 and the second sub-channel 25.

The outlet 26 is formed in the lower surface 102 of the substrate 1 and is disposed downstream of the distal end 232 of the main channel 23. The lower surface 102 of the substrate 1 has an attaching region 104 configured to surround the outlet 26.

In this embodiment, the substrate 1 is a laminate including upper and lower layers 11, 12, and the upper layer 11 is made from a transparent material. The microfluidic channel unit 2 is disposed between the upper and lower layers 11, 12. The first and second capillary inlets 21, 22 extend through the upper layer 11 and are in fluid communication with the first and second sub-channels 24, 25, respectively. The outlet 26 extends through the lower layer 102 and is in fluid communication with the distal end 232 of the main channel 23.

The suction member 3 is made from a shape memory polymer (SMP), and is disposed downstream of the outlet 26. The suction member 3 is configured to provide a predetermined suction force (i.e., a predetermined negative pressure) such that the second liquid 202 in the second sub-channel 25 is permitted to penetrate into the first liquid 201 in the main channel 23 so as to break up into droplets 203 in the first liquid 201, thereby generating monodisperse emulsions in the emulsion forming zone 103 (see FIG. 3(b)).

In this embodiment, the microfluidic channel unit 2 has a lipophilic affinity, the first liquid 201 is an oily liquid, and the second liquid 202 is an aqueous liquid.

Figure 4A:
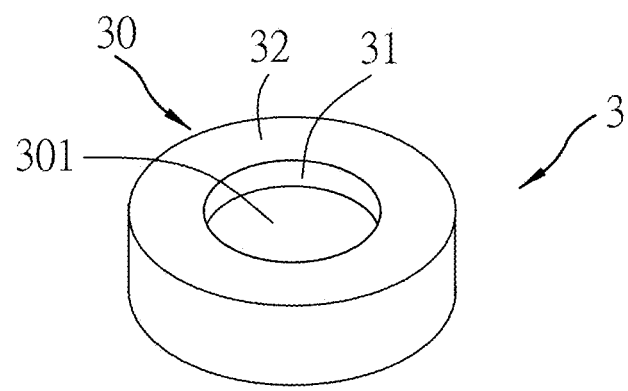
FIGS. 4(a) and 4(b) are schematic views illustrating the suction member in a permanent state and a temporary state, respectively.
Figure 4B:
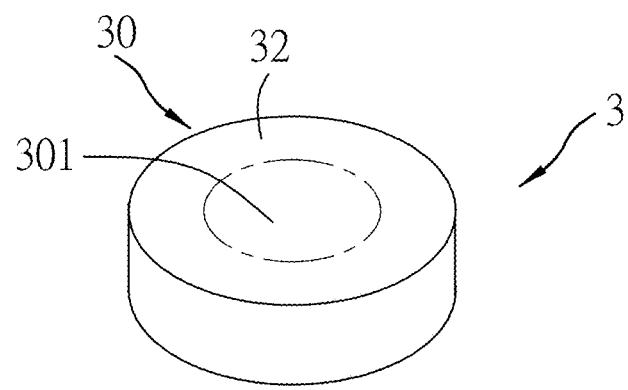

In addition, the suction member 3 has a top surface 30 and is transformable between a permanent state (FIG. 4(a)) and a temporary state (FIG. 4(b)) when subjected to an external stimulus, such as heat, electricity, light, etc. The top surface 30 includes an attachment region 32 and a cavity 31 that is surrounded by the attachment region 32 and that extends downward to terminate at a bottom region 301. In the permanent state, the attachment region 32 is higher than the bottom region 301 by a predetermined height. In the temporary state, the bottom region 301 is flush with the attachment region 32. The attachment region 32 is configured to mate with the attaching region 104 such that when the attachment region 32 of the suction member 3 in the temporary state is brought into fluid-tight engagement with the attaching region 104 to thereby bring the outlet 26 into register with the bottom region 301 (see FIG. 2), the predetermined suction force is generated in response to transformation of the suction member 3 from the temporary state to the permanent state. In this embodiment, heat energy is used to trigger transformation of the suction member 3. When the suction member 3 in the permanent state is hot-pressed at a temperature higher than a glass transition temperature (Tg) of the shape memory polymer (SMP), it is deformed to the temporary state. If the suction member 3 in the temporary state is cooled down to a temperature lower than the Tg of the SMP, the suction member 3 is maintained in the temporary state until the suction member 3 is heated to a temperature higher than the Tg of the SMP again. At this point, the suction member 3 is transformed to the permanent state.

In this embodiment, the suction member 3 is a modular structure such that the cavity 31 has a standardized volume for generating the predetermined suction force when the suction member 3 is transformed from the temporary state to the permanent state.

Figure 5:
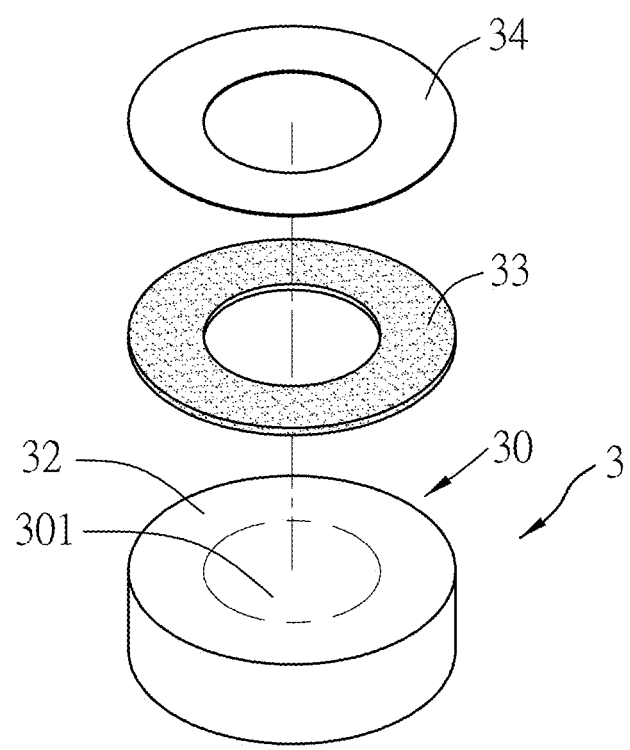
FIG. 5 is a schematic view illustrating a releasable layer which releasably covers an adhesive layer disposed on the suction member.

As shown in FIG. 5, an adhesive layer 33 is disposed on the attachment region 32 of the suction member 3, and a releasable layer 34 covers the adhesive layer 33. Before the suction member 3 is attached to the lower surface 102 of the substrate 1, the releasable layer 34 is removed from the adhesive layer 3 so as to permit the attachment region 32 of the suction member 3 in the temporary state to be brought into fluid-tight engagement with the attaching region 104 by virtue of the adhesive layer 33 (see FIG. 2).

In this embodiment, a monomer composition is polymerized to form the shape memory polymer (SMP), i.e., the suction member 3. The SMP formed from the monomer composition may fall into one of the following four categories: an SMP composed of a covalently cross-linked glassy thermoset network, an SMP composed of a covalently cross-linked semi-crystalline network, an SMP composed of a physically cross-linked glassy copolymer, and an SMP composed of a physically cross-linked semi-crystalline block copolymer. As the monomer composition may include various types of monomers which are well-known in the art and which can be selected based on requirements, details of the monomers are omitted herein for the sake of brevity.

In this embodiment, the monomer composition includes a monomer, a cross-linker, and an initiator. The monomer is selected from the group consisting of methyl methacrylate (MMA) and butyl methacrylate (BMA). The cross-linker may be ethylene glycol dimethacrylate (EGDMA) or tetraethylene glycol dimethacrylate (TEGDMA). The initiator may be 2,2-azobisisobutyronitrile (AIBN) or 1,1-azobiscyclohexanecarbonitrile (ABCN). In addition, to facilitate the transformation of the suction member 3, the monomer composition may further include a heat transferring material in an amount ranging from 1 wt % to 5 wt % based on the total weight of the monomer composition. The heat transferring material is selected from the group consisting of nanocarbon materials and boron nitride.

Figure 6:
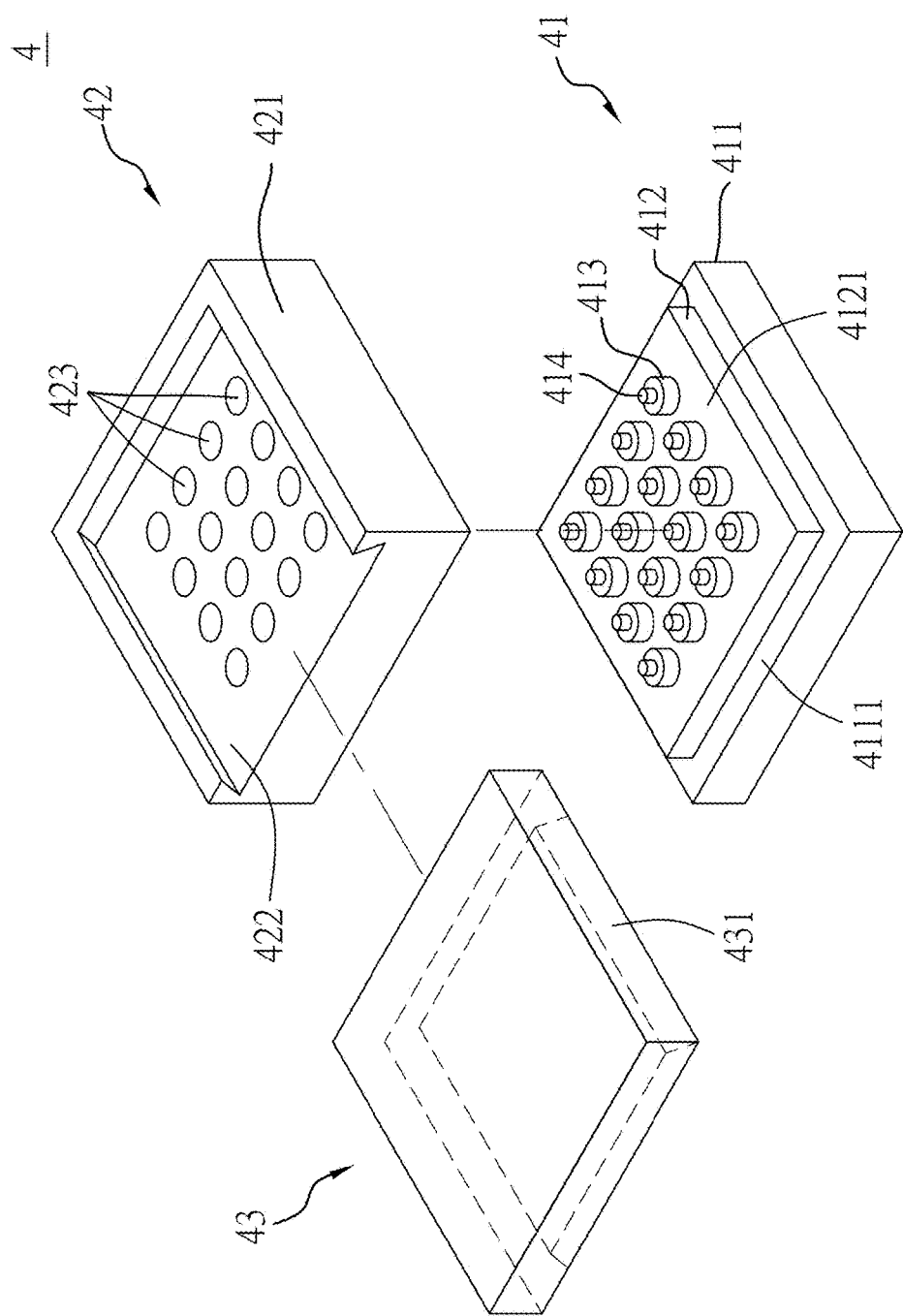
FIG. 6 is an exploded perspective view of a mold assembly for making a plurality of the suction members.
Figure 7:
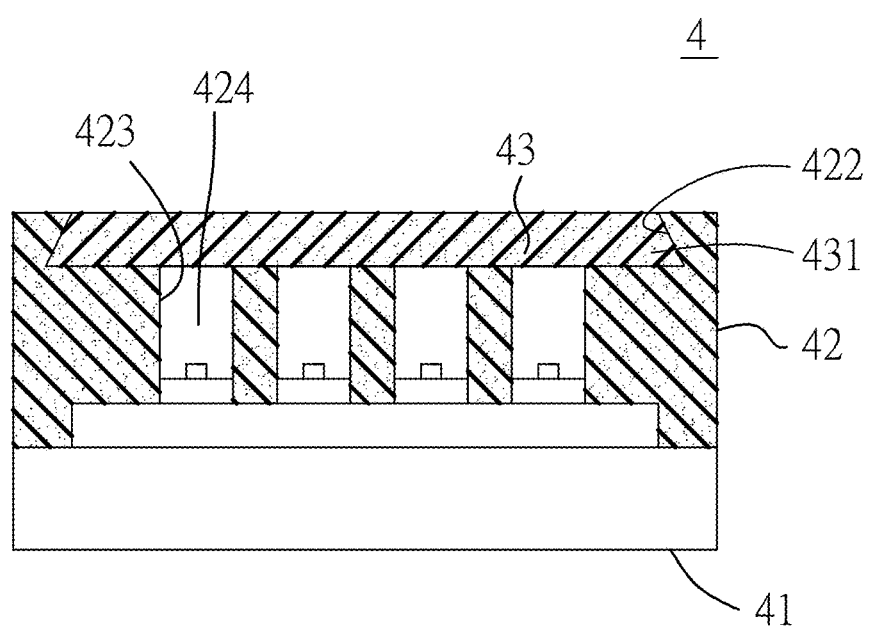
FIG. 7 is a cross-sectional view of the mold assembly in an assembled state.

FIGS. 6 and 7 show a mold assembly 4 for making a plurality of the suction members 3 simultaneously. The mold assembly 4 includes a base mold 41, a middle mold 42, and a cover 43.

The base mold 41 includes a lower segment 411, an upper segment 412, a plurality of mold pieces 413, and a plurality of protrusions 414. The lower segment 411 has an upward surface 4111 on which the upper segment 412 is disposed. The upper segment 412 has a flat surface 4121 with a dimension smaller than that of the upward surface 4111. The mold pieces 413 are disposed on the flat surface 4121 and arranged in an array. Each of the protrusions 414 extends upwardly from a corresponding one of the mold pieces 413. The mold pieces 413 and the protrusions 414 are different in dimensions and may have a circular or square cross-section. In this embodiment, the mold pieces 413 and the protrusions 414 are in cylindrical form.

The middle mold 42 is configured to be matingly engaged with the base mold 41, and includes a plurality of through holes 423. When the base mold 41 and the middle mold 42 are assembled, each of the through holes 423, a corresponding one of the mold pieces 413, and a corresponding one of the protrusions 414 cooperatively define a molding space 424.

The cover 43 is disposed to cover the middle mold 42. The cover 43 and the middle mold 42 are provided with an interengageable mechanism. In this embodiment, the middle mold 42 has an upper portion 421 provided with a guiding groove 422 and the cover 43 has a marginal edge 431 configured to engage the guiding groove 4211 such that the cover 43 is slidably and fittingly engageable with the middle mold 42. To make the suction members 3, the monomer composition is poured into the molding spaces 424 defined between the base mold 41 and the middle mold 42, and the cover 43 is disposed on and engaged with the middle mold 42 to close the molding spaces 424. After polymerization, the cover 43 and the middle mold 42 are removed, and the suction members 3 can be removed from the middle mold 42. To facilitate the removal of the suction members 3 from the mold assembly 4, each of the base mold 41, the middle mold 42, and the cover 43 may have an outer coating layer made of Teflon.

During polymerization of the monomer composition, although a pressure in each of the molding spaces 424 may increase, as the base mold 41, the middle mold 42, and the cover 43 are matingly engaged with one another, the monomer composition is not likely to leak out from the molding spaces 424.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

The invention claimed is:

1. A microfluidic device for generating monodisperse emulsions, comprising:
   (1) a substrate having an upper surface and a lower surface, and defining an emulsion forming zone, wherein said upper surface and said lower surface have a thickness between each other;
   (2) a first capillary inlet formed on said upper surface of said substrate for passage of a first liquid therethrough;
   (3) a second capillary inlet formed on said upper surface of said substrate for passage of a second liquid therethrough, the second liquid being immiscible with the first liquid;
   (4) a microfluidic channel unit formed in said substrate and having a high affinity for the first liquid, said microfluidic channel unit including
   a main channel which extends through said emulsion forming zone to terminate at a proximal end and a distal end disposed downstream of said proximal end,
   a first sub-channel disposed downstream of said first capillary inlet and upstream of said proximal end such that the first liquid is drawn into said first sub-channel through said first capillary inlet by virtue of capillary action of the first liquid and is further drawn into said main channel by the affinity between the first liquid and said microfluidic channel unit, and
   a second sub-channel disposed downstream of said second capillary inlet and upstream of said proximal end to permit the second liquid to be drawn into said second sub-channel through said second capillary inlet by virtue of capillary action of the second liquid;
   (5) an outlet formed on said lower surface of said substrate and disposed downstream of said distal end of said main channel; and
   (6) a suction member that is made from a shape memory polymer and is disposed downstream of said outlet, wherein said suction member is transformable between a permanent state and a temporary state when subjected to heat, electricity, or light; and said suction member is configured to provide a predetermined suction force such that the second liquid in said second sub-channel is permitted to penetrate into the first liquid in said main channel so as to break up into droplets in the first liquid, thereby generating monodisperse emulsions in said emulsion forming zone.

2. The microfluidic device according to claim 1, wherein said main channel is meander-shaped and includes a plurality of enlarged regions which are parallel to each other.

3. The microfluidic device according to claim 1, wherein said lower surface of said substrate has an attaching region configured to surround said outlet;
   said suction member has a top surface which includes an attachment region and a cavity surrounded by said attachment region, the cavity extending downward to terminate at a bottom region; and
   said suction member is transformable between the permanent state and the temporary state, the permanent state being a state where said attachment region is higher than said bottom region by a predetermined height and the temporary state being a state where said bottom region is flush with said attachment region,
   said attachment region being configured to mate with said attaching region such that when said attachment region in the temporary state is brought into fluid-tight engagement with said attaching region, thereby bringing said outlet into registering with said bottom region, the predetermined suction force is generated in response to transformation of said suction member from the temporary state to the permanent state.

4. The microfluidic device according to claim 3, wherein said suction member is a modular structure such that said cavity has a standardized volume for generating the predetermined suction force when said suction member is transformed from the temporary state to the permanent state.

5. The microfluidic device according to claim 4, further comprising an adhesive layer disposed on said attachment region of said suction member, and a releasable layer which covers said adhesive layer.

6. The microfluidic device according to claim 1, wherein
said substrate is a laminate including an upper layer and a lower layer, said upper layer being made from a transparent material;
said microfluidic channel unit is disposed between said upper and lower layers;
said first and second capillary inlets extend through said upper layer and are in fluid communication with said first and second sub-channels, respectively; and
said outlet extends through said lower layer and is in fluid communication with said distal end of said main channel.

7. The microfluidic device according to claim 1, wherein said microfluidic channel unit has a lipophilic affinity, the first liquid being an oily liquid and the second liquid being an aqueous liquid.

* * * * *